(12) United States Patent
Li et al.

(10) Patent No.: US 11,289,957 B2
(45) Date of Patent: Mar. 29, 2022

(54) GENERATOR AND WIND TURBINE

(71) Applicant: XINJIANG GOLDWIND SCIENCE & TECHNOLOGY CO., LTD., Xinjiang (CN)

(72) Inventors: Jinhui Li, Beijing (CN); Junwei Liu, Beijing (CN); Wenhua Xu, Beijing (CN)

(73) Assignee: XINJIANG GOLDWING SCIENCE & TECHNOLOGY CO., LTD., Urumqi (CN)

( * ) Notice: Subject to any disclaimer, the term of this patent is extended or adjusted under 35 U.S.C. 154(b) by 268 days.

(21) Appl. No.: 16/609,717

(22) PCT Filed: Jan. 4, 2019

(86) PCT No.: PCT/CN2019/070440
§ 371 (c)(1),
(2) Date: Oct. 30, 2019

(87) PCT Pub. No.: WO2020/048072
PCT Pub. Date: Mar. 12, 2020

(65) Prior Publication Data
US 2021/0336495 A1 Oct. 28, 2021

(30) Foreign Application Priority Data
Sep. 6, 2018 (CN) .......................... 201811039192.1

(51) Int. Cl.
*H02K 5/20* (2006.01)
*H02K 9/02* (2006.01)
(Continued)

(52) U.S. Cl.
CPC ............... *H02K 1/20* (2013.01); *F03D 9/255* (2017.02); *H02K 1/32* (2013.01); *H02K 3/24* (2013.01);
(Continued)

(58) Field of Classification Search
CPC .. F05B 2220/706; F05B 2240/12; H02K 1/20
See application file for complete search history.

(56) References Cited

U.S. PATENT DOCUMENTS

2006/0001269 A1  1/2006  Jansen et al.
2006/0071575 A1  4/2006  Jansen et al.
(Continued)

FOREIGN PATENT DOCUMENTS

CN  101793236 A  8/2010
CN  102246395 A  11/2011
(Continued)

OTHER PUBLICATIONS

First Australian Office Action dated Aug. 6, 2018; Appln No. 2010226142.
(Continued)

*Primary Examiner* — Quyen P Leung
*Assistant Examiner* — Christopher Stephen Schaller

(57) ABSTRACT

A generator and a wind turbine are provided. The generator includes an active cooling circuit and a passive cooling circuit, the active cooling circuit is in communication with a closed space, and the passive cooling circuit is in communication with the external environment. The active cooling circuit includes mutually communicating chambers located at two axial ends of the generator, an air gap between a rotor and a stator of the generator, and radial channels distributed along an axial direction of the generator. The active cooling circuit is provided with a cooling device in communication with the closed space, and the stator is fixed on a fixed shaft through a stator bracket. The passive cooling circuit includes a first axial channel running through the stator, a second axial channel running through the stator bracket, and an outer surface of the generator. A heat exchanger is further arranged inside the generator.

20 Claims, 7 Drawing Sheets

(51) Int. Cl.
- H02K 9/04 (2006.01)
- H02K 9/10 (2006.01)
- H02K 9/16 (2006.01)
- H02K 9/18 (2006.01)
- H02K 1/20 (2006.01)
- F03D 9/25 (2016.01)
- H02K 1/32 (2006.01)
- H02K 3/24 (2006.01)
- H02K 7/18 (2006.01)

(52) U.S. Cl.
CPC ........... *H02K 5/207* (2021.01); *H02K 7/1838* (2013.01); *F05B 2220/706* (2013.01)

(56) References Cited

U.S. PATENT DOCUMENTS

| | | | |
|---|---|---|---|
| 2010/0237727 A1* | 9/2010 | Mantere | H02K 9/10 310/64 |
| 2015/0211491 A1* | 7/2015 | Gudewer | F03D 9/25 290/55 |

FOREIGN PATENT DOCUMENTS

| | | | |
|---|---|---|---|
| CN | 102377286 | A | 3/2012 |
| CN | 103363834 | A | 10/2013 |
| CN | 106655564 | A | 5/2017 |
| CN | 107070020 | A * | 8/2017 |
| CN | 107612172 | A | 1/2018 |
| EP | 1641101 | A1 | 3/2006 |
| JP | 2012196101 | A | 10/2012 |

OTHER PUBLICATIONS

European Search Report dated Apr. 14, 2020; Appln No. 19759485.6.

The First Chinese Office Action dated Feb. 6, 2020; Appln. No. 201811039192.1.

International Search Report dated May 9, 2019; PCT/CN2019/070440.

* cited by examiner

GENERATOR AND WIND TURBINE

The present application claims the priority to Chinese Patent Application No. 201811039192.1, titled "GENERATOR AND WIND TURBINE", filed on Sep. 6, 2018, which is incorporated herein by reference in its entirety.

FIELD

The present application relates to the technical field of cooling, in particular to a generator and a wind turbine.

BACKGROUND

With the continuous adjustment of the wind power market and national policies, a wind turbine is gradually developed toward high power density. Among many cooling means used in the wind turbine, an air cooling means has been widely used in the field of wind turbine cooling due to its advantages of high reliability, easy maintenance and pollution-free. Based on whether a cooling medium in a cooling circuit requires a power drive device to maintain circulating in the cooling circuit, air cooling means may be divided into passive cooling (with no power drive device) and active cooling (with a power drive device).

The passive cooling in the air cooling means can simplify the structure of the wind turbine. However, it has insufficient cooling capacity for a limited space. The active cooling is gradually dominant due to its superior cooling capacity and great design freedom. With the continuous increase of the capacity of one single unit of the wind turbine, the power, volume, weight and costs of an active cooling device all rise, meanwhile the layout, installation and maintenance thereof are more difficult, and the reliability thereof is lower. Therefore, in addition to the cost advantage, the wind turbine with high power density often has greater loss and more self-power-consumption for the active cooling device, thereby making it difficult to balance the power generation efficiency of the whole apparatus.

SUMMARY

An object of the embodiments of the present application is to provide a generator and a wind turbine, which can improve a cooling effect for the generator and improve the power generation efficiency of the whole apparatus.

A generator provided according to the embodiments of the present application includes an active cooling circuit and a passive cooling circuit which are isolated from each other. The active cooling circuit is in communication with a closed space, and the passive cooling circuit is in communication with the external environment. The active cooling circuit includes mutually communicating chambers located at two axial ends of the generator, an air gap between a rotor and a stator of the generator, and radial channels distributed at intervals along an axial direction of the stator. A cooling device communicating with the closed space is provided in the active cooling circuit. The stator is fixed to a fixed shaft through a stator bracket. The passive cooling circuit includes a first axial channel running through the stator along the axial direction, a second axial channel running through the stator bracket, and an outer surface of the generator. A heat exchanger is further arranged in the generator, which is in communication with the radial channels and the second axial channel, respectively.

A wind turbine provided according to the embodiments of the present application includes any generator as described above. The generator has a windward side and a leeward side along the axial direction of the generator; a wheel hub, located on the windward side of the generator and arranged coaxial with the generator. The wheel hub drives the generator to rotate by the rotation of an impeller installed on an outer peripheral side of the wheel hub; and a nacelle, located on the leeward side of the generator.

By providing the active cooling circuit and the passive cooling circuit which are isolated from each other, the generator and the wind turbine provided by the embodiments of the present application, compared with the generator only with the passive cooling circuit, make up for the insufficient cooling capacity within a limited layout space due to the existence of the active cooling circuit. Compared with the generator only with the active cooling circuit, part of the heat loss of the generator is taken away by the passive cooling circuit, which relieves the burden of the active cooling circuit and reduces the power and the self-power-consumption of the cooling device in the active cooling circuit, thus reducing the volume and weight of the cooling device and improving the power generation efficiency of the whole apparatus.

BRIEF DESCRIPTION OF THE DRAWINGS

The present application may be better understood from the following description of the specific embodiments of the present application in conjunction with the drawings.

Other features, objects and advantages of the present application will become more apparent by reading the following detailed description of the non-restrictive embodiments with reference to the drawings, where the same or similar reference numerals represent the same or similar features.

REFERENCE NUMERALS IN FIGS. 1 TO 13

Figure 1:
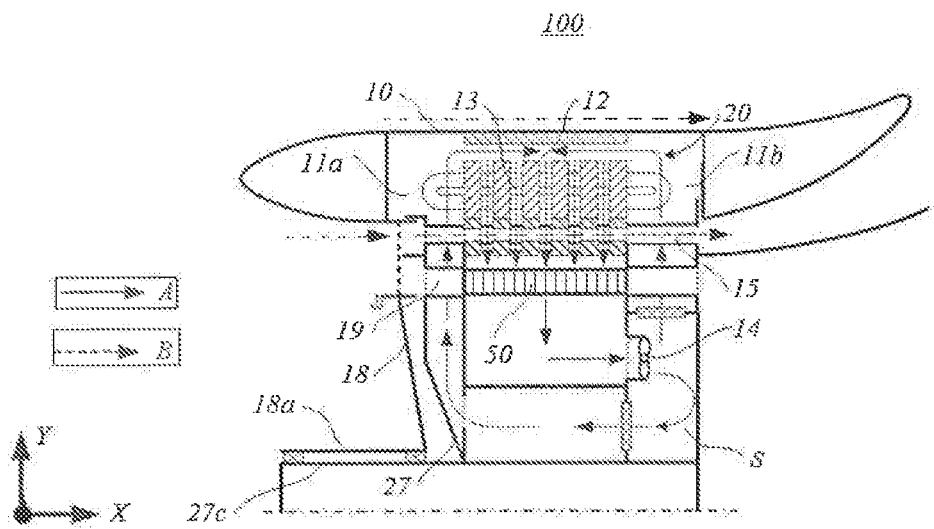
FIG. 1 is a partial sectional view of a generator according to an embodiment of the present application.

S—closed space; A—active cooling circuit; B—passive cooling circuit; X—axial direction; Y—radial direction; Z—circumferential direction; R1, R2—branch; C1—first airflow; C2—second airflow; C3—third airflow; C4—fourth airflow; C5—fifth airflow; C6—sixth airflow; L1—first annular space; L2—second annular space; C—external incoming airflow; C'—external airflow on outer surface of the generator; K—chord; $P_1$, $P_2$, $P_3$—pressure; $\Delta P_{1-3}$—first pressure difference; $\Delta P_{13-2}$—second pressure difference;

10—rotor; 10a—rotor yoke; 10b—permanent magnet; 11a—chamber, 11b—chamber; 12—air gap; 13—radial channel; 14—cooling device; 15—first axial channel; 15a—stator axial channel; 16—radial filter member; 17—axial filter member; 18—rotor bracket; 18a—rotating shaft; 18b—supporting rib; 19—second axial channel;

20—stator; 21—iron core assembly; 22—yoke portion; 22a—through hole; 22b—rib; 22c—mounting groove; 23—tooth portion; 23a—tooth groove; 24—casing; 25—gasket; 26—winding; 27—stator bracket; 27a—first end plate; 27b—second end plate; 27c—fixed shaft; 1—first casing; 2—second casing; 3—third casing; 4—fourth casing; 5—splitter; 6—deflector; 28a—first partition plate; 28b—second partition plate; 1a—air inlet; 1b—air inlet; 1c—air outlet; 29—third partition plate; 29a—first chamber; 29b—second chamber;

30—flow guiding device; 30a—outer generatrix of flow guiding device; 30b—inner generatrix of flow guiding device; 40—acceleration device; 40a—outer generatrix of acceleration device; 40b—inner generatrix of acceleration device; 50—heat exchanger; 51—plate member; 52—cover plate; 51a—first channel; 51b—second channel; 100—generator; 110—windward side; 120—leeward side; 200—wheel hub; 300—nacelle.

DETAILED DESCRIPTION OF EMBODIMENTS

The features and exemplary embodiments of various aspects of the present application are described in detail below. In the following detailed description, a number of specific details are provided in order to provide a full understanding for the present application. However, it is apparent to those skilled in the art that the present application may be implemented without some of these specific details. The following description of the embodiments is only intended to provide a better understanding for the present application by illustrating embodiments of the present application. The present application is by no means limited to any specific configuration or algorithm provided below, but covers any modification, substitution and improvement of elements, components and algorithms without departing from the spirit of the present application. In the drawings and the following description, well-known structures and techniques are not shown in order to avoid unnecessarily obscuring the present application.

The exemplary embodiments are described more fully with reference to the drawings, now. However, the exemplary embodiments can be implemented in various forms and should not be construed as being limited to the embodiments described herein. On the contrary, the present application is more comprehensive and complete, and the idea of the exemplary embodiments is fully conveyed to those skilled in the art, by providing these embodiments. In the drawings, thicknesses of the areas and the layers may be exaggerated for clarity. The same reference numerals in the drawings represent the same or similar structures, so detailed descriptions thereof are omitted.

Referring to FIG. 1, a generator 100 is provided according to an embodiment of the present application. The generator 100 includes an active cooling circuit A and a passive cooling circuit B which are isolated from each other. The active cooling circuit A is in communication with a closed space S, and the passive cooling circuit B is in communication with the external environment.

The active cooling circuit A, as shown by solid arrows in FIG. 1, includes mutually communicating chambers 11a, 11b located at two axial ends of the generator 100, an air gap 12 between a rotor 10 and a stator 20 of the generator, and radial channels 13 distributed at intervals along an axial direction X of the stator 20. A cooling device 14 communicating with the closed space S is arranged in the active cooling circuit A. The stator 20 is fixed to a fixed shaft 27c through a stator bracket 27.

The passive cooling circuit B, as shown by dotted arrows in FIG. 1, includes a first axial channel 15 running through the stator 20 in the axial direction X, a second axial channel 19 running through the stator bracket 27, and an outer surface of the generator.

A heat exchanger 50 is further arranged inside the generator 100, which is in communication with the radial channels 13 and the second axial channel 19, respectively.

The generator 100 in the embodiments of the present application may have an internal-stator structure, that is, the rotor 10 is arranged along the periphery of the stator 20. The generator 100 may have an external-stator structure, that is, the stator 20 is arranged along the periphery of the rotor 10. The stator 20 is fixed to the fixed shaft 27c through the stator bracket 27, and the rotor 10 is fixed to a rotating shaft 18a through a rotor bracket 18. The rotating shaft 18a and the fixed shaft 27c are supported by bearings to achieve relative rotation. A dynamic seal connection is formed between the stator bracket 27 and the rotor 10, further forming chambers 11a and 11b at two axial ends of the generator 100. A drive mode of the generator 100 may be direct drive, or semi-direct drive, or doubly-fed generator or the like, which is not further described.

The embodiments of the present application construct an active cooling circuit A and a passive cooling circuit B which are isolated from each other in structure by constructing the body structure of the generator 100. The active cooling circuit A is isolated from the external environment, which can prevent impurities in the external environment from being actively introduced into the interior of the generator 100. The cooling medium is the air circulating in the closed space S, and the cooling medium realizes circulating through the cooling device 14 in the circuit. The heat loss absorbed by the active cooling circuit A is transferred to the second axial channel 19 through the heat exchanger 50 after flowing out of the radial channels 13, and the active cooling circuit finally exchanges heat with the external environment. This cooling circuit is active for the cooling of the generator 100. The passive cooling circuit B is in communication with the external environment, and allows the air in the external environment to be introduced into the cooling circuit by an ingenious construction of the rotor 10 of the generator 100 and the natural flow of the air in the external environment, which is passive for the cooling of the generator. The cooling mediums in the active cooling circuit A and the passive cooling circuit B which are isolated from each other in structure cool the generator 100 at the same time, and the heat transfer between the two cooling circuits is realized through the heat exchanger 50.

By providing the active cooling circuit A and the passive cooling circuit B which are isolated from each other in structure, the generator 100 provided by the embodiments of the present application, compared with the generator only with the passive cooling circuit, make up for the insufficient cooling capacity for a limited layout space due to the existence of the active cooling circuit. Compared with the generator only with the active cooling circuit, part of the heat loss of the generator is taken away by the passive cooling circuit, which relieves the burden of the active cooling circuit and reduces the power and the self-power-consumption of the cooling device 14 in the active cooling circuit A, thus reducing the volume and weight of the cooling device 14 and improving the power generation efficiency of the whole apparatus. Besides, since the active cooling circuit A is isolated from the external environment, the impurities in the external environment are prevented from being actively introduced into the interior of the generator 100, thereby improving the reliability of the generator 100.

The specific structure of the generator 100 is further described in detail below in conjunction with the drawings.

Figure 2:
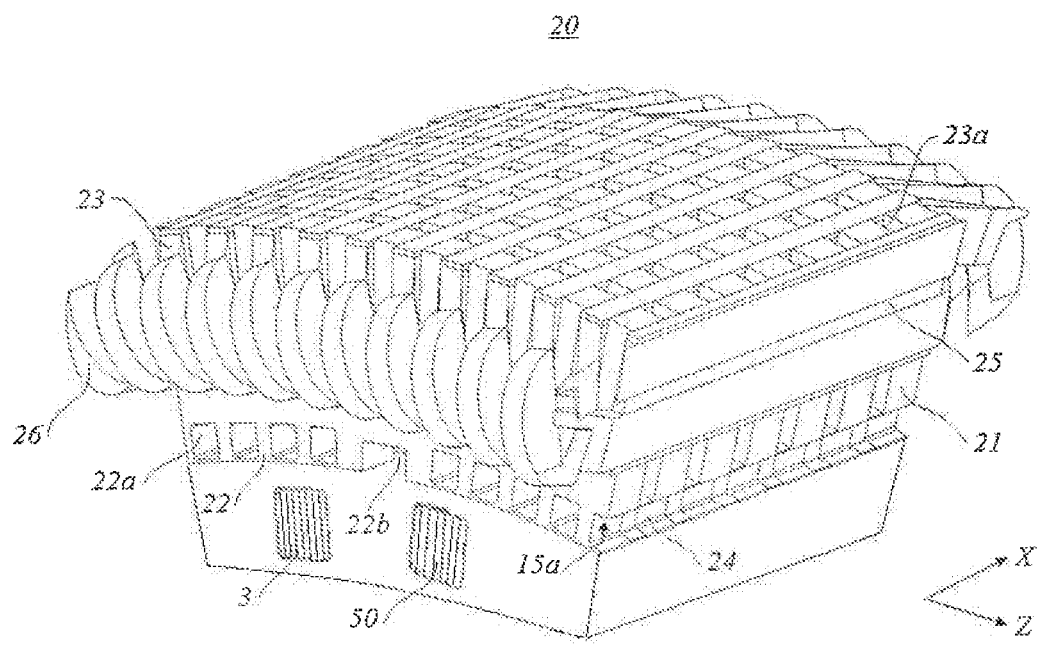
FIG. 2 is a schematic view showing the partial structure of a stator of the generator shown in FIG. 1.
Figure 3:
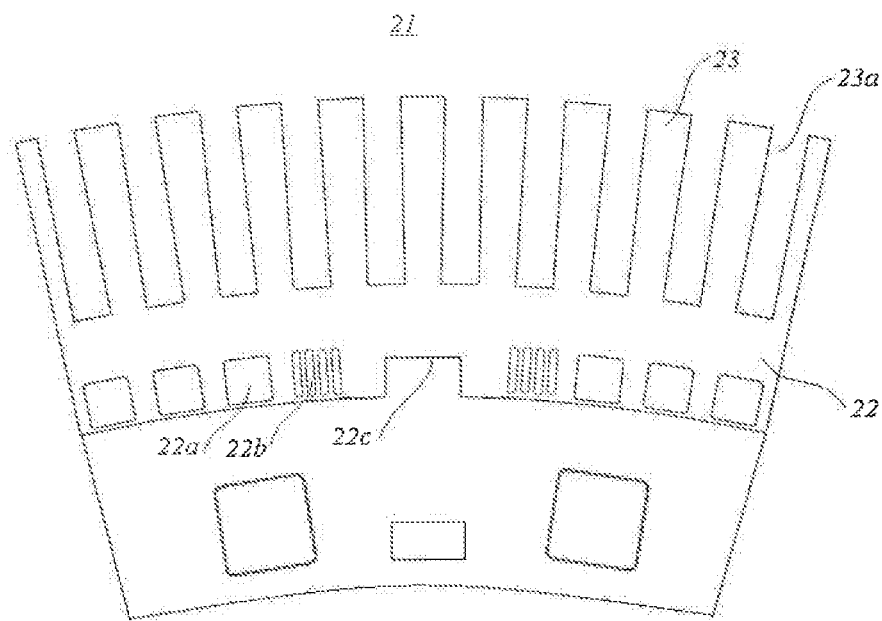
FIG. 3 is a schematic view showing the partial structure of an iron core assembly in the stator shown in FIG. 2.

Referring to FIGS. 2 and 3, the stator 20 of the generator 100 includes multiple iron core assemblies 21 arranged at intervals along the axial direction X. Each of the iron core assemblies is formed by stacking multiple iron core sheets along the axial direction X, and the radial channel 13 is formed between every two adjacent iron core assemblies 21.

The first axial channel 15 includes stator axial channels 15a running through the multiple iron core assemblies 21 along the axial direction X. Each of the iron core assemblies 21 includes a yoke portion 22 and a tooth portion 23 integrally formed with the yoke portion 22, the tooth portion 23 is provided with multiple tooth grooves 23a arranged at intervals in the circumferential direction Z of the iron core assembly 21, and the yoke portion 22 is provided with a through hole 22a corresponding to the tooth grooves 23a. Casings 24 communicating with the through hole 22a are arranged between adjacent iron core assemblies 21. The through hole 22a and the casings 24 together form the stator axial channels 15a.

Further, the multiple tooth grooves 23a of the multiple iron core assemblies 21 are arranged in one-to-one correspondence and extend along the axial direction X. Each of the tooth grooves 23a is provided with a gasket 25, and a winding 26 is arranged in the space surrounded by the gasket 25 and the tooth groove 23a. The yoke portion 22 is further provided with at least one mounting groove 22c for fixing the stator 20 to the stator bracket 27. The tooth grooves 23a are arranged corresponding to the through holes 22a, which is beneficial to reduce the resistance of the air flow in the radial channels 13, relatively shortens heat transfer paths between the windings 26 and the through holes 22a, and improves the heat transfer efficiency of the windings 26.

The number of the through hole 22a is at least one, two or more through holes 22a are arranged at intervals in the circumferential direction Z of the iron core assembly 21, and the through hole 22a may be a square hole, or a round hole or a polygonal hole.

At the same time, the number of casing 24 is at least one, which is arranged one to one corresponding to the through hole 22a. The casing 24 allows the multiple through holes 22a of the yoke portion 22 of the iron core assembly 21 to constitute a communicating stator axial channel 15a, and also plays roles of support and position-limiting for the multiple iron core assemblies 21. As shown in FIG. 2. The casing 24 may a square tube, or a circular tube or a polygonal tube.

As an optional embodiment, a rib 22b is arranged in the at least one through holes 22a, which is beneficial to increase heat dissipation areas of the stator axial channels 15a, thereby enhancing the cooling effect, as shown in FIG. 3.

In addition, an axial section of the through hole 22a constituting the stator axial channel 15a shown in FIG. 3 is completely constructed in the yoke portion 22 of the iron core assembly 21.

As an optional embodiment, each of the iron core assemblies 21 includes an attachment portion (not shown in the figure) arranged along the radial direction Y and close to the yoke portion 22, and the through hole 22a may be provided at the attachment portion. In this case, the axial section of the through hole 22a can be constructed completely outside the yoke portion 22 of the iron core assembly 21 through the attachment portion.

As an optional embodiment, the through hole 22a includes two portions distributed along the radial direction Y, one part of which is arranged in the yoke portion 22 and the other part is arranged in the attachment portion. In this case, one part of the axial section of the through hole 22a may be constructed in the yoke portion 22 of the iron core assembly 21, and the other part is constructed outside the yoke portion 22 of the iron core assembly 21 through the attachment portion.

It should be noted that for an inner-stator structure, the through hole 22a on the yoke portion 22 is located on a radial inside of the tooth groove 23a, and for an outer-stator structure, the through hole 22a on the yoke portion 22 is located on a radial outside of the tooth groove 23a. In addition, the stator 20 shown in FIG. 2 adopts a double-layer winding structure which is formed in a distributed manner, but the winding structure applicable to the present application may also be, but not limited to, other winding structures such as centralized windings, scattered windings and single-layer windings.

Taking the generator having the inner-stator structure as an example, the structures of the active cooling circuit A and the passive cooling circuit B of the generator and the cooling process of the generator are described hereinafter.

Figure 4:
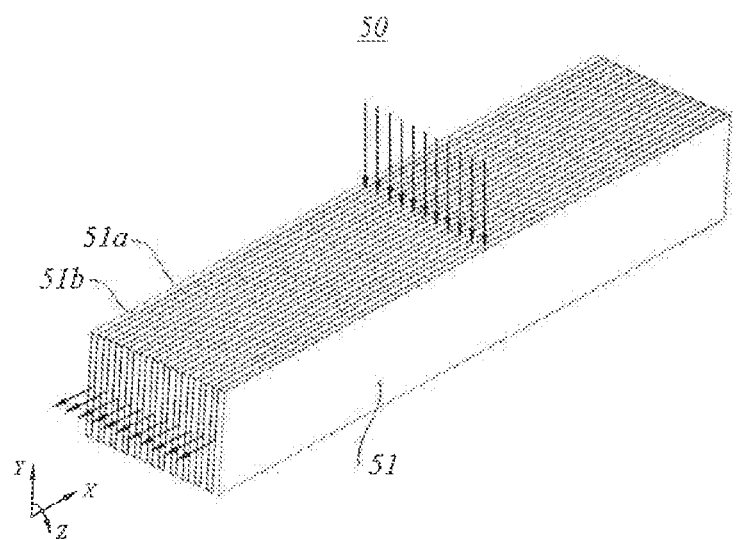
FIG. 4 is a schematic structural view of a heat exchanger in the generator shown in FIG. 1.

Referring to FIG. 4, the heat exchanger 50 includes multiple plate members 51 arranged at intervals. Multiple layers of first channels 51a and second channels 51b isolated from each other are formed between the multiple plate members 51, and the first channel 51a and the second channel 51b are arranged in stagger. The heat exchanger 50 communicates with the radial channels 13 through the first channels 51a, and the heat exchanger 50 communicates with the second axial channel 19 through the second channels 51b.

The heat exchanger 50 is preferably a plate heat exchanger, which is formed by stacking a series of metal sheets with a certain corrugated shape. Airflows in the first channels 51a and the second channels 51b flow along the radial direction Y and the axial direction X, respectively, as shown by arrows in FIG. 4, and exchange heat through the metal sheets among the plate members 51.

Figure 5:
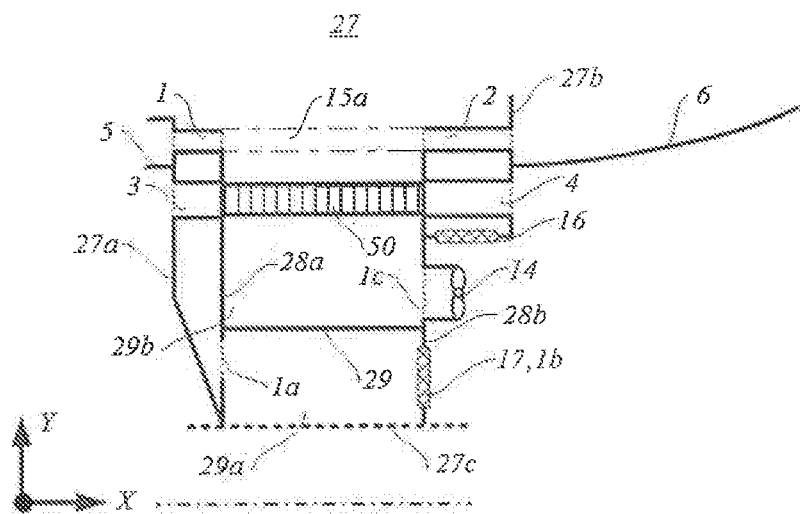
FIG. 5 is a schematic view showing the partial structure of a stator bracket in the generator shown in FIG. 1.

Referring to FIG. 5, the stator bracket 27 includes a first end plate 27a and a second end plate 27b arranged opposite to each other along the axial direction X, and a first partition plate 28a and a second partition plate 28b located between the first end plate 27a and the second end plate 27b and coaxially arranged.

A first casing 1 and a third casing 3 running through the first end plate 27a are arranged at intervals on the first end plate 27a in the radial direction Y, a second casing 2 and a fourth casing 4 running through the second end plate 27b are arranged at intervals on the second end plate 27b in the radial direction Y, the third casing 3 is located between the first end plate 27a and the first partition plate 28a, and the fourth casing 4 is located between the second partition plate 28b and the second end plate 27b.

The first axial channel 15 further includes the first casing 1 and the second casing 2 which communicate with the stator axial channels 15a, and the second axial channel 19 further includes the third casing 3 and the fourth casing 4 which communicate with the heat exchanger 50.

Preferably, inner walls of the first casing 1, the second casing 2 and the casing 24 have the same axial section size and shape as that of the through hole 22a, and inner walls of the third casing 3 and the fourth casing 4 have the same axial section size and shape as that of the heat exchanger 50. The passive cooling circuit B is isolated from the active cooling circuit A through the first casing 1, the casing 24, the second casing 2, the third casing 3, the heat exchanger 50 and the fourth casing 4.

Further, the first partition plate 28a and the second partition plate 28b are in a sealed connected with the yoke portion 22 and fixed to the fixed shaft 27c, the first end plate 27a and the first partition plate 28a are in a sealed connection along the radial Y inside of the generator 100, and a radial filter member 16 is arranged between the second end plate 27b and the second partition plate 28b.

The first partition plate 28a is provided with an air inlet 1a, and the second partition plate 28b is provided with an air inlet 1b and an air outlet 1c. A space between the first partition plate 28a and the second partition plate 28b is divided into a first chamber 29a and a second chamber 29b by a third partition plate 29. The air inlets 1a, 1b are in communication with the first chamber 29a, and the air outlet 1c is in communication with the second chamber 29b. The heat exchanger 50 is arranged in the second chamber 29b, and the cooling device 14 is arranged outside the air outlet 1c. An axial filter member 17 is provided on the air inlet 1b of the second partition plate 28b.

Figure 6:
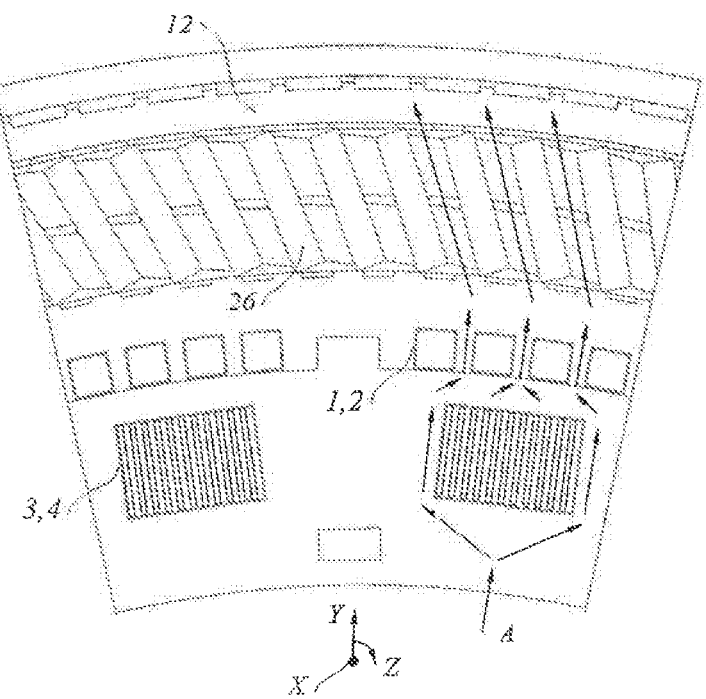
FIG. 6 is a schematic view of an airflow distribution in the chambers of the active cooling circuit shown in FIG. 1.

Referring to FIG. 6, since the flow situations of the airflows in the end chambers 11a and 11b of the generator 100 are relatively similar, flowing of airflow in both chambers can be described by FIG. 6. Taking the chamber 11a as an example, airflow entering the chamber 11a first bypasses the third casing 3 through gaps between the third casing 3, and then bypasses the first casing 1 through gaps between the first casing 1, and then bypasses the end portions of the end windings 26 through gaps between the end portions of the windings 26. Finally, the airflow in the chamber 11a flows into the air gap 12 from end entrances of the air gap 12. The airflow in the chamber 11a cools the end portions of the windings 26 as it flows through the end portions of the windings 26, as shown by solid arrows in FIG. 6.

Figure 7:
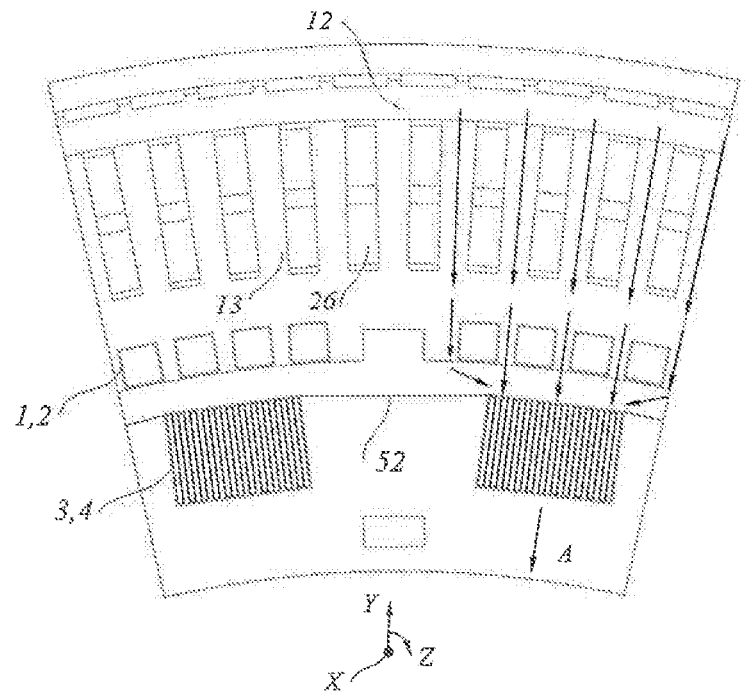
FIG. 7 is a schematic view of the airflow distribution in the radial channels of the active cooling circuit shown in FIG. 1.

Referring to FIG. 7, the airflow in the radial channels 13 are from the division of the air gap 12, and the divided airflow first flows through the tooth grooves 23a of the radial channels 13 formed by the gaps between portions of the windings 26 inside the grooves, and then enters the yoke portions 22 of the radial channels 13, and finally flows out of the radial channels 13 through gaps between the casings 24 located inside the radial channels 13.

In addition, multiple heat exchangers 50 are provided and arranged at intervals along a circumferential direction of the second chamber 29b. A cover plate 52 is arranged between adjacent heat exchangers 50, the second chamber 29b is divided into two subspaces along the radial direction Y by the cover plate 52, and the two subspaces are in communication with each other through a corresponding heat exchanger 50.

Airflow flowing out of the radial channels 13 is converged by the cover plate 52, flows through the first channels 51a and the second channels 51b of the heat exchanger 50 and exchanges heat with the external air in the second axial channel 19 in the passive cooling circuit B, thereby reducing a fluid temperature in the active cooling circuit A. The airflow cools the end portions of the windings 26 and the iron core assemblies 21 as it flows through the end portions of the windings 26 and the iron core assemblies 21, as shown by the solid arrows in FIG. 7.

Figure 8:
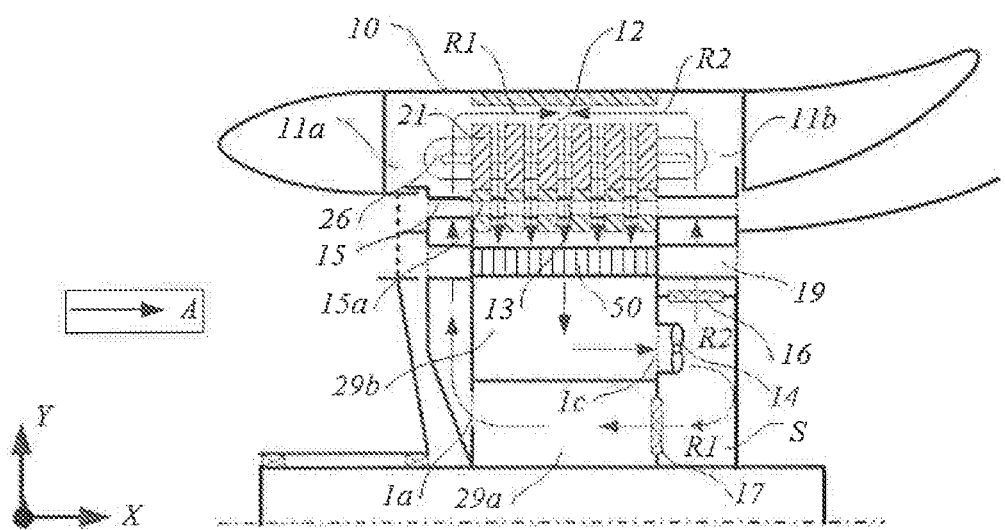
FIG. 8 is a schematic view of the airflow distribution in the active cooling circuit of the generator shown in FIG. 1.

Referring to FIG. 8, a schematic diagram of the airflow distribution of the active cooling circuit A of the generator 100 is shown. The air in the closed space S is divided into two branches R1, R2 under drive of the cooling device 14, and enters the chambers 11a, 11b at two axial ends of the generator 100, respectively.

The air in the branch R1 enters the first chamber 29a through the axial filter member 17 and then bypasses the third casing 3 and the first casing 1 to enter the chamber 11a at one end. The air in the branch R2 enters the chamber 11b at the other end through the radial filter member 16 and bypasses the fourth casing 4 and the second casing 2. The air in the two branches R1, R2 entering the chambers 11a, 11b flows through the windings 26, the rotor 10, the iron core assemblies 21 in a listed sequence and bypasses the casings 24 along the active cooling circuit A, then flows through the heat exchanger 50 into the second chamber 29b, and the air is discharged into the closed space S through the cooling device 14 after being cooled by cooling air entering the second axial channel 19, as shown by the solid arrows in FIG. 8.

During the circulating of the airflow in the active cooling circuit A, the cooling device 14 causes internal spaces of the generator 100 to be in a negative pressure state, the airflow in the internal spaces of the generator 100 is discharged into the closed space S by the cooling device 14, while the negative pressure state in the internal spaces of the generator 100 cause the airflow discharged into the closed space S by the cooling device 14 to again flow through the radial filter 16 member and the axial filter member 17 and into the internal spaces of the generator 100. After absorbing part of a stator heat loss and part of a rotor heat loss, the airflow flows into the first channels 51a of the heat exchanger 50, and transfers the absorbed heat loss by the heat exchanger 50 to the external air flowing in the second channels 51b of the heat exchanger 50 in the passive cooling circuit B, thereby cooling the airflow in the active cooling circuit A, so that the airflow in the active cooling circuit A can again enter the internal chambers of the generator 100 and cool the stator 20 and rotor 10.

During the flowing of the airflow in the active circuit A from entering the chambers 11a and 11b to flowing out of the radial channels 13, the end portions of the windings 26, the portions of the windings 26 inside the grooves, the iron core assemblies 21 and the rotor 10 are cooled, respectively. The active cooling circuit A takes away the remaining heat loss of the stator except for part of the heat loss of the stator taken away by the passive cooling circuit B, and the active cooling circuit A also takes away the remaining heat loss of the rotor except for part of the heat loss of the rotor taken away by the passive cooling circuit B.

Figure 9:
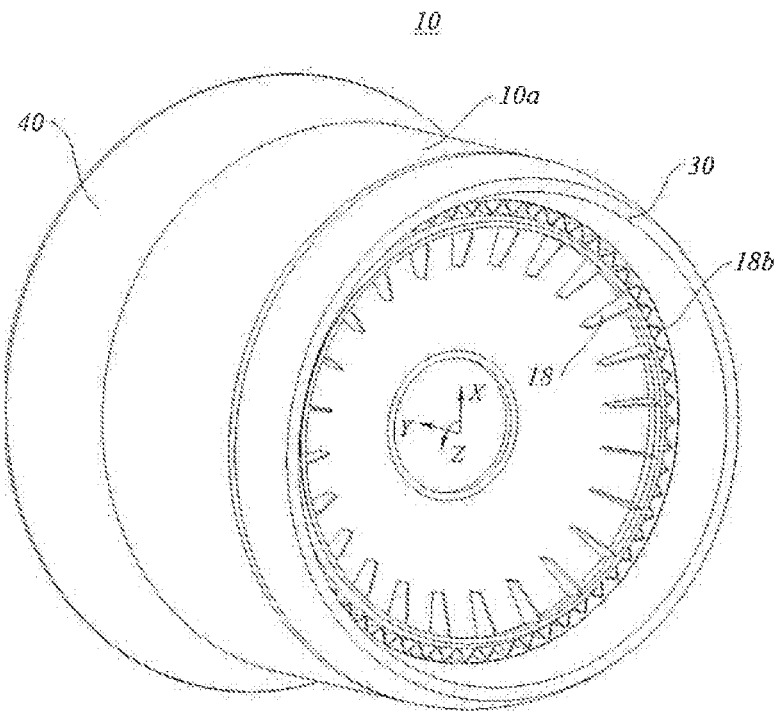
FIG. 9 is a schematic structural view of a rotor of the generator shown in FIG. 1.
Figure 10:
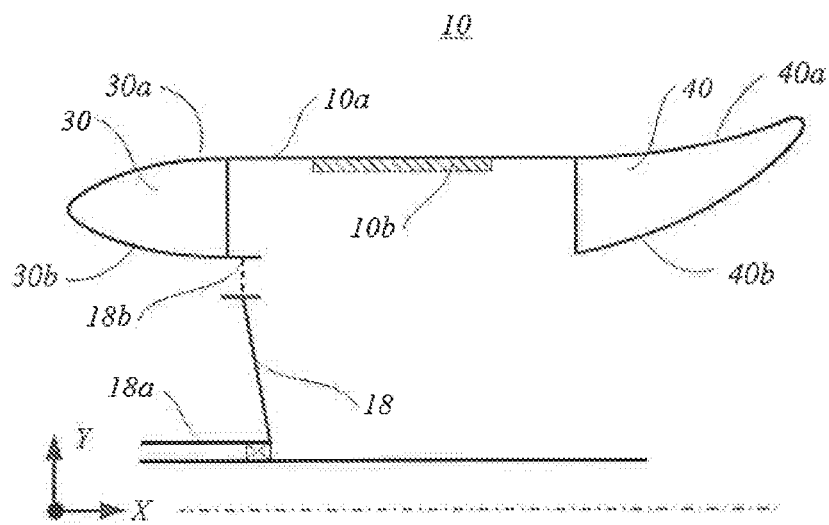
FIG. 10 is a schematic view showing the partial structure of the rotor of the generator shown in FIG. 1.

Referring to FIGS. 5, 9 and 10, the rotor 10 is fixed to the rotating shaft 18a through the rotor bracket 18, and the rotor 10 includes rotor yoke 10a and permanent magnets 10b mounted on the rotor yoke 10a. Multiple supporting ribs 18b are arranged at intervals between the rotor bracket 18 and the rotor yoke 10a along the circumferential direction Y, and annular gaps are formed between the multiple supporting ribs 18b, so that the external incoming air flows from one side of the first end plate 27a to one side of the second end plate 27b through the annular gaps. The supporting ribs 18b are used for connecting the rotor bracket 18 and the rotor yoke 10a, so that the rotor bracket 18 and the rotor yoke 10a can rotate simultaneously with the rotating shaft 18a.

The passive cooling circuit B has a windward side and a leeward side along the axial direction X, a side where the first end plate 27a is located is the windward side, and a side where the second end plate 27b is located is the leeward side.

The rotor yoke 10a is provided with a flow guiding device 30 located on the same side as the first end plate 27a along the axial direction X, and the external incoming air is deflected and divided by the flow guiding device 30. The flow guiding device 30 has an annular thin-wall structure, and the structure conforms to a streamline of aerodynamics. Specifically, the flow guiding device 30 is a thin-wall rotating body with a hollow interior for reducing weight. A section of the flow guiding device 30 along its own radial direction Y includes an outer generatrix 30a and an inner generatrix 30b intersecting with each other. A latitudinal circle radius of the outer generatrix 30a gradually decreases along the axial direction X away from the rotor yoke 10a, and a latitudinal circle radius of the inner generatrix 30b gradually increases along the axial direction X away from the rotor yoke 10a. At least one of the outer generatrix 30a and the inner generatrix 30b may be an arc curve or a straight line. Preferably, an outer diameter of the outer generatrix 30a on a side close to the rotor yoke 10a is equal to an outer diameter of the generator 100, so that the external air flows smoothly through the outer surface of the generator 100. The outer generatrix 30a and the inner generatrix 30b can be arranged symmetrically or asymmetrically, depending on the actual situation of the external incoming airflow.

Further, the rotor yoke 10a is provided with an acceleration device 40 located on the same side as the second end plate 27b along the axial direction X. The acceleration device 40 is a thin-wall rotating body with a hollow interior to reduce weight. A section of the acceleration device 40 along its own radial direction Y includes an outer generatrix 40a and an inner generatrix 40b intersecting with each other, latitudinal circle radii of the outer generatrix 40a and the inner generatrix 40b gradually increases along the axial direction X away from the rotor yoke 10a. At least one of the outer generatrix 40a and the inner generatrix 40b may be an arc curve or a straight line. Preferably, an outer diameter of the outer generatrix 40a on a side close to the rotor yoke 10a is equal to the outer diameter of the generator 100, so that the external incoming airflow smoothly flows through the outer surface of the generator 100.

As an optional embodiment, the first end plate 27a is further provided with a splitter 5 located between the first casing 1 and the third casing 3. The splitter 5 is a thin-wall rotating body with a hollow interior for reducing weight. Preferably, a latitudinal circle diameter of the splitter is a fixed value to facilitate division of the airflow when the airflow passes through the splitter 5 and facilitate the airflow to flow through inner and outer surfaces of the splitter 5, as shown in FIG. 5.

As an optional embodiment, the second end plate 27b is further provided with a deflector 6 located between the second casing 2 and the fourth casing 4. The deflector 6 is a thin-wall rotating body with a hollow interior to reduce weight, and a latitudinal circle radius of a generatrix of the deflector gradually increases along the axial direction away from the rotor yoke, so as to facilitate the airflow to flow smoothly through inner and outer surfaces of the deflector 6, as shown in FIG. 5.

An embodiment of the generator 100 having the flow guiding device 30, the splitter 5, the acceleration device 40 and the deflector 6 is taken as an example hereinafter to illustrate a cooling process of the passive cooling circuit B cooling the generator 100.

Figure 11:
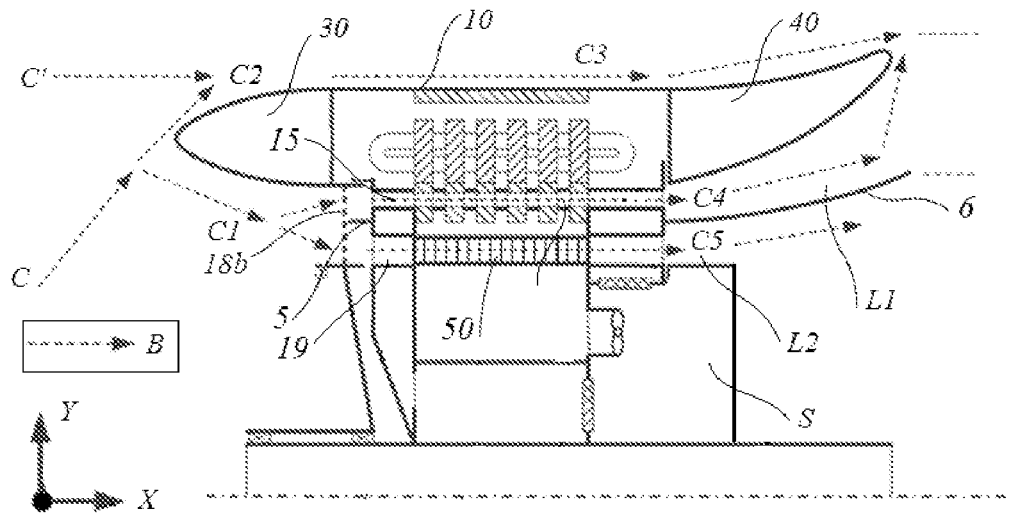
FIG. 11 is a schematic view of the airflow distribution in the passive cooling circuit of the generator shown in FIG. 1.
Figure 12:
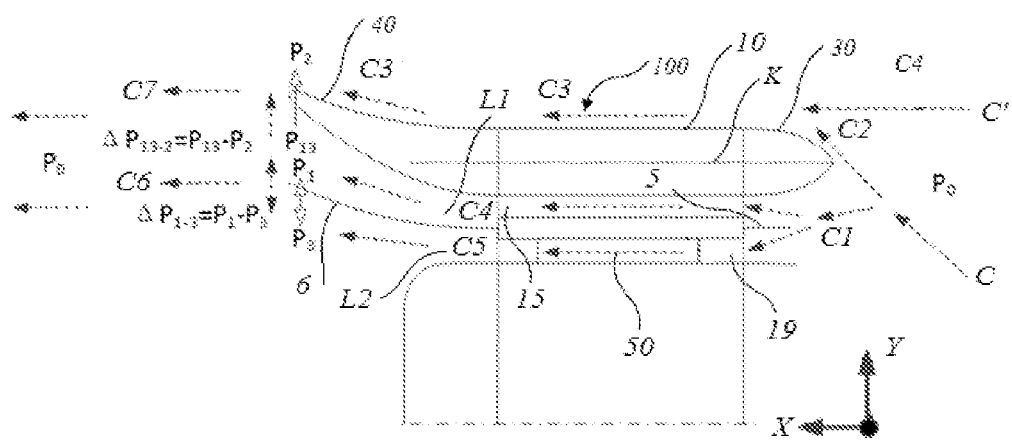
FIG. 12 is a schematic view showing a working principle of a flow guiding device and an acceleration device of the rotor shown in FIG. 8.

Referring to FIGS. 11 and 12, an external incoming airflow C is divided into a first airflow C1 and a second airflow C2 when passing through the flow guiding device 30, and the first airflow C1 is again divided into a fourth airflow C4 and a fifth airflow C5 when passing through the splitter 5.

The fourth airflow C4 enters the first axial channel 15 through the annular gaps, and enters a first annular space L1 formed by the acceleration device 40 and the deflector 6 after flowing through the stator 20. The fifth airflow C5 enters the second axial channel 19 through the annular gaps, and enters a second annular space L2 formed by the closed space S and the deflector 6 after flowing through the heat exchanger 50.

The second airflow C2 converges with an external airflow C' on the outer surface of the generator 100 to form a third airflow C3, and the third airflow bypasses the accelerating device 40 after being attached to outer surface of the rotor yoke 10a along the axial direction X.

The fifth airflow C5 and the fourth airflow C4 generate a first pressure difference $\Delta P_{1-3}$ on an inner side and an outer side of the deflector 6, the fourth airflow C4 and the third airflow C3 generate a second pressure difference $\Delta P_{13-2}$ on an inner side and an outer side of the acceleration device 40 to drive the first airflow C1 and the second airflow C2 to continue to flow, respectively, as shown by the dotted arrows in FIG. 11.

As shown in FIG. 12, during the cooling process of the passive cooling circuit B cooling the generator 100, the working principle of the flow guiding device 30 and the splitter 5 is described as follows. An upstream incoming air on the windward side of the generator 100 can be schematically divided into two parts, that is, an incoming air located inside a chord K of the flow guiding device 30 and an incoming air located outside the chord K. A static pressure of the upstream incoming airflow on the windward side is an atmospheric pressure P0. When the upstream incoming air C on the windward side flows to the inner side of the chord K of the flow guiding device 30, a flow direction of the incoming air is shifted to form an airflow. When the airflow continues to flow downstream and close to the flow guiding device 30, the airflow is divided into the first airflow C1 and the second airflow C2. The first airflow C1 flows toward the inner side of the chord K, and the second airflow C2 flows toward the outer side of the chord K. After flowing through the flow guiding device 30, the divided first airflow C1 is again divided by the splitter 5 on the stator bracket 27 to form the fourth flow C4 and the fifth flow C5, and the fourth flow and the fifth flow enter the first axial channel 15 and the second axial channel 19, respectively. While the second airflow C2 shunted by the flow guiding device 30 converges with the incoming air C' outside the chord K to form the third airflow C3 and flows along the axial direction X of the outer surface of the rotor yoke 10a.

A function of the flow guiding device 30 in the process of dividing the external incoming air C is as follows. An arc structure on the inner side of the chord K of the flow guiding device 30 can capture more external incoming air C, so that more external incoming air C can be shunted to the inner side of the chord K, so that the stator 20 with more concentrated heat loss obtains a large cooling air volume. An arc structure on the outer side of the chord K can alleviate a flow separation phenomenon, caused by a sudden change of a flow section, of the second airflow C2 shunted by the external incoming air C to the outer side of the chord K, so that the third airflow C3 formed by the convergence of the second airflow C2 and the external airflow C' on the outer side of the chord K better adheres to the outer surface of the rotor yoke 10a, thereby providing the rotor 10 a better cooling effect.

A function of the splitter 5 is to perform flow distribution for the first airflow C1 shunted by the flow guiding device 30, and an installation angle of the splitter 5 can be adjusted according to actual requirements. When an end of the splitter 5 away from the first end plate 27a is inclined inward, the first airflow C1 shunted by the flow guiding device 30 is more captured to form the fourth airflow C4, and when the end of the splitter 5 away from the first end plate 27a is inclined outward, more the first airflow C1 shunted by the flow guiding device 30 is captured to form the fifth airflow C5.

Further, during the cooling process of the passive cooling circuit B cooling the generator 100, working principles of the acceleration device 40 and the deflector 6 are as follows. The fourth airflow C4 flowing out of the first axial channel 15 continues to flow downstream in the annular space L1 formed by an inner side of the acceleration device 40 mounted on the leeward side of the rotor yoke 10a and the deflector 6 mounted on the stator bracket 27. The fifth airflow C5 flowing out of the second axial channel 19 continues to flow downstream in the annular space L2 formed by the deflector 6 and the closed space S. The third airflow C3 flowing through the outer surface of the rotor yoke 10a continues to flow downstream on an outer side of the acceleration device 40.

During a flow process of the fourth airflow C4 in the annular space L1, the static pressure of the fourth airflow C4 gradually changes to pressure $P_1$ due to a gradual change of the flow section. During a flow process of the fifth airflow C5 in the annular space L2, the static pressure of the fifth airflow C5 gradually changes to pressure $P_3$ due to the gradual change of the flow section. During a flow process of the third airflow C3 on the outer side of the acceleration device 40, the flow section decreases gradually, and the static pressure of the third airflow C3 gradually decreases to pressure $P_2$. Because the acceleration device 40 exhibits in a gradually expanding structure to the downstream of the leeward side, the static pressure $P_2$ of the third airflow C3 when the third airflow flows out of a downstream end portion of the acceleration device 40 on the leeward side is less than the average static pressure $P_{13}$ of the fourth airflow C4 and the fifth airflow C5 at outlets of the space L1 and the space L2 formed by the acceleration device 40 and the closed space S. Therefore, a second pressure difference $\Delta P_{13-2}=P_{13}-P_2$ pointing from the inner side to the outside of the acceleration device 40 is formed between the airflows flowing on the inner side and the outer side of the acceleration device 40. The second pressure difference $\Delta P_{13-2}$ enhances a driving force during the whole flow processes of the fourth airflow C4 and the fifth airflow C5, so that more external incoming air C is shunted to the inner side of the chord K of the flow guiding device 30, thereby further improving the cooling capacity of the branch in the passive cooling circuit B for cooling the stator 20 and the airflow in the active cooling circuit A.

A function of the deflector 6 during the flow processes of the fourth airflow C4 and the fifth airflow C5 is the same as that of the splitter 5. The shape and a length extending downstream on the leeward side of the deflector 6 can be designed according to specific needs, so that there is a certain first pressure difference $\Delta P_{1-3}=P_1-P_3$ between the fourth airflow C4 at the outlet of the annular space L1 and the fifth airflow C5 at the outlet of the annular space L2. In a case that the first pressure difference $\Delta P_{1-3}$ pointing from the inner side to the outer side of the deflector 6, the first pressure difference $\Delta P_{1-3}$ increases the driving force of the fifth airflow C5, so that more first airflow C1 is shunted into the second axial channel 19. In a case that the pressure difference pointing from the outer side to the inner side of the deflector 6, the first pressure difference $\Delta P_{1-3}$ increases the driving force of the fourth airflow C4, so that more first airflow C1 is shunted into the first axial channel 15.

Due to the function of the acceleration device 40, one portion of the airflow converged by the fourth flow C4 and the fifth flow C5 continues to flow downstream to form a sixth airflow C6, the other portion is deflected toward the outer side of the acceleration device 40 and converges with the third airflow C3 on the outer side of the acceleration device 40 to form a seventh airflow C7. During the process that the sixth airflow C6 and the seventh airflow C7 continue to flow to a far place downstream of the leeward side, the airflow gradually restores to a balance state with automatic adjustment of the static pressure, and the static pressure of the airflow at the far downstream of the leeward side finally restores to the atmospheric pressure P0.

The flow guiding device 30 and the splitter 5 constructed at an inlet of the passive cooling circuit B and the acceleration device 40 and the deflector 6 constructed at an outlet of the passive cooling circuit B further improve the cooling capacity of the passive cooling circuit B in the active and passive cooling circuit.

It can be understood that the generator 100 provided by the embodiments of the present application may be provided with only the flow guiding device 30, or only the acceleration device 40, or both the flow guiding device 30 and the acceleration device 40. In addition, the generator 100 provided by the embodiment of the present application may be provided with only the splitter 5, or only the deflector 6, or both the splitter 5 and the deflector 6. Besides, the flow guiding device 30 and the acceleration device 40 may form a variety of combination forms with the splitter 5 and the deflector 6, which is not further described.

Thereby, the fourth airflow C4 in the passive cooling circuit B, divided from the first airflow C1, cools the stator 20 while flowing through the first axial channel 15, taking away part of the heat loss of the stator generated during the operation of the generator 100. The fifth airflow C5, shunted from the first airflow C1, cools the air in the active cooling circuit A that absorbs the remaining heat loss of the stator 20 and part of the heat loss of the rotor 10 while flowing through the second axial channel 19, taking away the remaining heat loss of the stator and part of heat loss of the rotor generated during the operation of the generator 100. That is, the first airflow C1 in the passive cooling circuit B takes away all the heat loss of the stator and part of the heat loss of the rotor.

The second airflow C2 cools the rotor 10 while flowing through the outer surface of the rotor yoke 10a, taking away the remaining part of the heat loss of the rotor generated by the operation of the generator 100. All the heat loss during the operation of the generator 100 is finally taken away.

As previously described, in the process of cooling the generator 100, the airflows in the two cooling circuits are isolated from each other through the first casing 1, the casings 24, the second casing 2, the third casing 3, the heat exchanger 50 and the fourth casing 4, and the first casing 1, the casings 24, the second casing 2, the third casing 3, and the fourth casing 4 are share components of the two cooling circuits except for the heat source components, which are thermally conductive for the airflows in the two cooling circuits.

Preferably, the first casing 1 and the third casing 3 have inner walls and outer walls which are arranged for heat conduction. Since a temperature of the airflow outside the first casings 1 and the third casing 3 cooled by the external environment air through the heat exchanger 50 is still higher than a temperature of the airflow directly introduced to the inner side of the first casing 1 and the third casing 3 from the external environment, so that the airflow inside the first casing 1 and the third casing 3 absorbs part of the heat of the outer airflow. Although this heat transfer process adversely affects the following process that the airflow inside the first casing 1 and the third casing 3 cools the stator 20, the airflow outside the first casings 1 and the third casings 3 transfers part of the heat to the inner airflow, which enhances the cooling effect of the outer airflow to the stator 20 and the rotor 10 during the subsequent cooling process. Therefore, the two cancel each other to a certain extent, and such arrangement can reduce the manufacturing cost of the first casing 1 and the third casing 3.

Further preferably, the casings 24, the second casing 2 and the fourth casing 4 have inner walls and outer walls arranged to be thermally isolated.

The airflows in the second casing 2 and the fourth casing 4 respectively absorb part of the heat loss of stator and part of the airflow heat in the active cooling circuit A, which is about to be discharged into the hot air in the external environment, while the airflow outside the second casing 2 and the fourth casing 4 is the cold air cooled by the heat exchanger 50. If the second casing 2 and the fourth casing 4 are thermally conductive to the inner airflow and the outer airflow, the outer airflow of the second casing 2 and the fourth casing 4 will absorb part of the heat of the inner airflow and will carried the heat into the subsequent cooling process of the rotor 10 and the stator 20.

For the casings 24 in the radial channels 13, the outer airflow of the casings 24 is hot air that absorbs part of the heat loss of the rotor and the heat loss of the stator. Since the airflow in the casings 24 in the radial channels 13 of the stator 20 is the air gradually absorbing part of the heat loss of the stator and changing from cold to hot, if the casings 24 are thermally conductive to the inner and outer airflows of the casings 24, the airflow in the upstream casings 24 will absorb part of the heat of the airflow outside the casings 24, such that the inner airflow will adversely affect the subsequent cooling of the downstream stator 20, and the inner airflow of the downstream casings 24 may absorb part of the heat of the outer airflow, or may transfer part of its own heat to the outer airflow. In a case that the inner airflow of the downstream casings 24 absorbs part of the heat of the outer airflow, the adverse effect is the same as that of the inner airflow of the upstream casings 24 absorbing part of the heat of the outer airflow. In a case that the inner airflow of the downstream casings 24 transfers part of its own heat to the outer airflow, the heat exchange burden of the heat exchanger 50 will be increased, so that the airflow in the active cooling circuit A cannot be sufficiently cooled, and will adversely affect the cooling of the stator 20 and rotor 10 after reentering the internal chambers of the generator 100.

Therefore, the casings 24, the second casing 2 and the fourth casing 4 are arranged to be thermally isolated, which can maximize the cooling capacity of the active and passive cooling circuits.

It should be noted that, although the generator with the internal-stator structure is described as an example for ease of description, it should be understood that, according to the exemplary embodiments of the present application, the working principles of the active cooling circuit A and the passive cooling circuit B are also applicable to generators with an external-stator structure.

Figure 13:
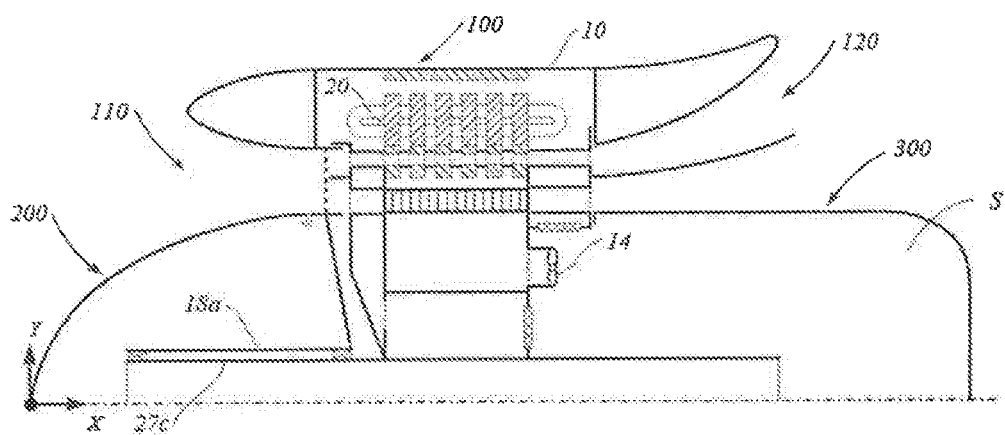
FIG. 13 is a schematic view showing the partial structure of a wind turbine according to an embodiment of the present application.

Referring to FIG. 13, a wind turbine is also provided according to the embodiments of the present application, which includes any of the generators 100 described above, a wheel hub 200 and a nacelle 300.

The generator 100 has a windward side 110 and a leeward side 120 along the axial direction. The wheel hub 200 is located on the windward side 110 of the generator 100 and is arranged coaxially with the generator 100. A maximum outer diameter of the wheel hub 200 is less than a minimum inner diameter of the second axial channel 19 of the generator 100, facilitating the external incoming air to enter the first axial channel 15 and the second axial channel 19. The wheel hub 200 drives the generator 100 to rotate by the rotation of an impeller mounted on a peripheral side of the wheel hub.

The nacelle 300 is located on the leeward side 120 of the generator 100. Optionally, an outer contour of the nacelle 300 is spaced from the second axial channel 19 of the generator 100 by a predetermined distance to facilitate discharging the hot air which absorbs heat in the first axial channel 15 and the second axial channel 19 into the external environment. A closed space S communicating with the active cooling circuit A may be formed between the nacelle 300 and the generator 100. Besides, the closed space S may also be formed in the generator 100.

In the process of generating electricity, the wind turbine provided by the embodiment of the present application can not only capture the kinetic energy of the wind and convert the kinetic energy into electrical energy, but also can fully exploit the heat transfer potential of the wind. By constructing the body structure of the generator 100, two active and passive cooling circuits which are isolated from each other in structure are constructed, thereby reducing the power and self-power-consumption of the cooling device 14, improving the power generation efficiency of the whole apparatus, reducing the volume and weight of the cooling device 14, saving the space of the nacelle 300, realizing the high structure-integration of the cooling system and the generator, and reducing the cost of the cooling system.

In addition, the generator according to the exemplary embodiments described above may be applied to various devices that require setting a generator, such as but not limited to a wind turbine.

Those skilled in the art should understand that the above embodiments are exemplary rather than restrictive. Different technical features that appear in different embodiments may be combined to achieve beneficial effects. Those skilled in the art should be able to understand and implement other variations of the disclosed embodiments on the basis of the study of the drawings, the specification and the appended claims. In the claims, the term "comprise" does not exclude other devices or steps, the indefinite article "a/an" does not exclude a plurality, and the terms "first" and "second" are used to indicate names rather than any particular order. Any reference numerals in the claims should not be construed as a limitation of the protection scope of the present application. The functions of various parts appearing the claims can be implemented by a single hardware or software module. The presence of certain technical features in different subordinate claims does not mean that these technical features cannot be combined to achieve beneficial effects.

The invention claimed is:

1. A generator, comprising an active cooling circuit and a passive cooling circuit which are isolated from each other, wherein the active cooling circuit is in communication with a closed space, and the passive cooling circuit is in communication with an external environment;

wherein the active cooling circuit comprises mutually communicating chambers located at two axial ends of the generator, an air gap between a rotor and a stator of the generator, and radial channels spaced apart along an axial direction of the stator, and a cooling device in communication with the closed space is provided in the active cooling circuit, and the stator is connected to a fixed shaft;

wherein the passive cooling circuit comprises a first axial channel running through the stator in the axial direction, a second axial channel running through a stator bracket, and an outer surface of the generator; and wherein a heat exchanger is further arranged inside the generator, the heat exchanger is in communication with the radial channels and the second axial channel, respectively.

2. The generator according to claim 1, wherein the stator comprises a plurality of iron core assemblies arranged at intervals along the axial direction, the radial channels are formed between every two adjacent iron core assemblies;

the first axial channel comprises stator axial channels running through the plurality of iron core assemblies along the axial direction, each of the iron core assemblies comprises a yoke portion and a tooth portion integrally formed with the yoke portion, a plurality of tooth grooves arranged at intervals in a circumferential direction of each iron core assembly is provided on the tooth portion, the yoke portion is provided with a through hole corresponding to the tooth grooves, and a casing in communication with the through hole is arranged between each two adjacent iron core assemblies, and the stator axial channel is formed by the through hole and the casing.

3. The generator according to claim 2, wherein the heat exchanger comprises a plurality of plate members arranged at intervals, a plurality layers of first channels and second channels isolated from each other are formed among the plurality of plate members, and the first channels and the second channels are arranged in stagger, the heat exchanger is in communication with the radial channels through the first channels, and the heat exchanger is in communication with the second axial channel through the second channels.

4. The generator according to claim 2, wherein the stator bracket comprises a first end plate and a second end plate arranged opposite to each other along the axial direction, and a first partition plate and a second partition plate located between the first end plate and the second end plate and coaxially arranged; and a first casing and a third casing running through the first end plate are arranged at intervals on the first end plate in a radial direction, a second casing and a fourth casing running through the second end plate are arranged at intervals on the second end plate in the radial direction, and the third casing is located between the first end plate and the first partition plate, the fourth casing is located between the second partition plate and the second end plate.

5. The generator according to claim 4, wherein the first axial channel further comprises the first casing and the second casing in communication with the stator axial channels, the second axial channel further comprises the third casing—and the fourth casing in communication with the heat exchanger; and the passive cooling circuit is isolated from the active cooling circuit through the first casing, the casings in communication with through holes arranged between any two adjacent iron core assemblies, the second casing, the third casing, the heat exchanger and the fourth casing.

6. The generator according to claim 4, wherein both the first partition plate and the second partition plate are in a sealed connection with the yoke portion and fixed to the fixed shaft, the first end plate is in a sealed connection with the first partition plate along an inner side of the generator in the radial direction, a radial filter member is arranged between the second end plate and the second partition plate;

an air inlet is provided on the first partition plate, an air inlet and an air outlet are provided on the second partition plate, a space between the first partition plate and the second partition plate is divided into a first chamber and a second chamber by a third partition plate, the air inlets are in communication with the first chamber, the air outlet is in communication with the second chamber, the heat exchanger is arranged in the second chamber, the cooling device is arranged outside the air outlet, and an axial filter member is provided on the air inlet of the second partition plate.

7. The generator according to claim 6, wherein air in the closed space is divided into two branches to respectively enter the chambers at the both axial ends of the generator under drive of the cooling device;

air in one branch enters the first chamber through the axial filter member and then bypasses the third casing and the first casing to enter the chamber at one end of the generator; and air in the other branch enters the chamber at the other end of the generator through the radial filter member and bypasses the fourth casing and the second casing, air in the two branches entering the chambers flows through windings, the rotor, and the iron core assemblies in a listed sequence and bypasses the casings along the active cooling circuit, then flows through the heat exchanger into the second chamber, and then is discharged into the closed space through the cooling device after being cooled by cooling air entering the second axial channel.

8. The generator according to claim 6, wherein a plurality of heat exchangers are arranged at intervals along a circumferential direction of the second chamber, a cover plate is arranged between adjacent heat exchangers, the second chamber is divided into two subspaces by the cover plate along the radial direction, and the two subspaces are in communication with each other through the heat exchanger.

9. The generator according to claim 4, wherein a splitter located between the first casing and the third casing is further provided on the first end plate, the splitter is a thin-wall rotary body with a hollow interior; and/or, a deflector located between the second casing and the fourth casing is further provided on the second end plate, the deflector is a thin-wall rotary body with a hollow interior, and a latitudinal circle radius of a generatrix of the deflector gradually increases along the axial direction away from a rotor yoke.

10. The generator according to claim 9, wherein the rotor is fixed to a rotating shaft through a rotor bracket, the rotor comprises the rotor yoke and a permanent magnet mounted on the rotor yoke, a plurality of supporting ribs is arranged at intervals between the rotor bracket and the rotor yoke along the circumferential direction, and annular gaps are formed between the plurality of the supporting ribs, which allows external incoming air to flow from one side of the first end plate to one side of the second end plate through the annular gaps.

11. The generator according to claim 10, wherein a flow guiding device located on a same side as the first end plate along the axial direction is arranged on the rotor yoke, the flow guiding device is a thin wall rotary body with a hollow interior, a section of the flow guiding device along the radial direction of the flow guiding device comprises an outer generatrix and an inner generatrix intersecting with each other, a latitudinal circle radius of the outer generatrix gradually decreases along the axial direction away from the rotor yoke, and a latitudinal circle radius of the inner generatrix gradually increases along the axial direction away from the rotor yoke.

12. The generator according to claim 11, wherein an acceleration device located on a same side as the second end plate along the axial direction is arranged on the rotor yoke, the acceleration device is a thin wall rotating body with a hollow interior, and a section of the acceleration device along the radial direction of the acceleration device comprises an outer generatrix and an inner generatrix, latitudinal circle radii of the outer generatrix and the inner generatrix gradually increase along the axial direction away from the rotor yoke.

13. The generator according to claim 12, wherein external incoming air is divided into a first airflow and a second airflow when passing through the flow guiding device, the first airflow is further divided into a fourth airflow and a fifth airflow when passing through the splitter;
the fourth airflow enters the first axial channel through the annular gaps, and enters a first annular space formed by the acceleration device and the deflector-after flowing through the stator;
the fifth airflow enters the second axial channel through the annular gaps, and enters a second annular space formed by the closed space and the deflector after flowing through the heat exchanger;
the second airflow converges with external airflow on the outer surface of the generator to form a third airflow, and the third airflow bypasses the accelerating device after adhering to the outer surface of the rotor yoke along the axial direction; and
the fifth airflow and the fourth airflow generate a first pressure difference between an inner side and an outer side of the deflector, and the fourth airflow and the third airflow generate a second pressure difference between an inner side and an outer side of the acceleration device, and the first pressure difference and the second pressure difference respectively drive the first airflow and the second airflow to continue to flow.

14. The generator according to claim 2, wherein the through hole is arranged on the yoke portion; or
each iron core assembly comprises an attachment portion arranged along the radial direction and close to the yoke portion, the through hole is arranged at the attachment portion; or
the through hole comprises two parts distributed along the radial direction, one part of which is arranged at the yoke portion, and the other part is arranged at the attachment portion.

15. The generator according to claim 2, wherein at least one through holes is provided, two or more through holes are arranged at intervals along the circumferential direction of the iron core assemblies, each of the at least one through holes is a square hole, or a round hole, or a polygon hole, or each of the at least one through holes are provided with a rib.

16. The generator according to claim 4, wherein the first casing has an inner wall and an outer wall arranged to be thermally conductive, the third casing has an inner wall and an outer wall arranged to be thermally conductive, the second casing has an inner wall and an outer wall arranged to be thermally isolated, the fourth casing has an inner wall and an outer wall arranged to be thermally isolated, and each of the casings in communication with through holes arranged between any two adjacent iron core assemblies has an inner wall and an outer wall arranged to be thermally isolated.

17. A wind turbine, comprising:
a generator according to claim 1, wherein the generator has a windward side and a leeward side along the axial direction;
a wheel hub, located on the windward side of the generator and arranged coaxially with the generator, wherein the wheel hub drives the generator to rotate through a rotation of an impeller installed on a peripheral side of the wheel hub; and
a nacelle, located on the leeward side of the generator.

18. The generator according to claim 3, wherein at least one through holes is provided, two or more through holes are arranged at intervals along the circumferential direction of the iron core assemblies, each of the at least one through holes is a square hole, or a round hole, or a polygon hole, or each of the at least one through holes are provided with a rib.

19. The generator according to claim 4, wherein at least one through holes is provided, two or more through holes are arranged at intervals along the circumferential direction of the iron core assemblies, each of the at least one through holes is a square hole, or a round hole, or a polygon hole, or each of the at least one through holes are provided with a rib.

20. A wind turbine, comprising:
a generator according to claim 2, wherein the generator has a windward side and a leeward side along the axial direction;
a wheel hub, located on the windward side of the generator and arranged coaxially with the generator, wherein the wheel hub drives the generator to rotate through a rotation of an impeller installed on a peripheral side of the wheel hub; and
a nacelle, located on the leeward side of the generator.

* * * * *

UNITED STATES PATENT AND TRADEMARK OFFICE
CERTIFICATE OF CORRECTION

| | |
|---|---|
| PATENT NO. | : 11,289,957 B2 |
| APPLICATION NO. | : 16/609717 |
| DATED | : March 29, 2022 |
| INVENTOR(S) | : Jinhui Li, Junwei Liu and Wenhua Xu |

It is certified that error appears in the above-identified patent and that said Letters Patent is hereby corrected as shown below:

On the Title Page

Item (73) the Assignee name:
XINJIANG GOLDWING SCIENCE & TECHNOLOGY CO., LTD., Urumqi (CN)
Is changed to:
XINJIANG GOLDWIND SCIENCE & TECHNOLOGY CO., LTD., Urumqi (CN)

Signed and Sealed this
Second Day of August, 2022

Katherine Kelly Vidal
*Director of the United States Patent and Trademark Office*